United States Patent
Temple-Wilson

(10) Patent No.: US 6,572,310 B2
(45) Date of Patent: Jun. 3, 2003

(54) SELF-CLEANING DRILL CHUCK

(75) Inventor: Richard E. Temple-Wilson, South Yorkshire (GB)

(73) Assignee: Power Tool Holders Incorporated, Christiana, DE (US)

( * ) Notice: Subject to any disclaimer, the term of this patent is extended or adjusted under 35 U.S.C. 154(b) by 0 days.

(21) Appl. No.: 10/245,609

(22) Filed: Sep. 16, 2002

(65) Prior Publication Data

US 2003/0026670 A1 Feb. 6, 2003

Related U.S. Application Data

(63) Continuation of application No. 09/733,856, filed on Dec. 8, 2000, now abandoned.

(51) Int. Cl.⁷ .......................... B23B 45/00; B23B 31/12
(52) U.S. Cl. ...................... 408/56; 408/239 A; 408/240
(58) Field of Search .................. 408/124, 240, 408/239 A, 56, 67; 409/231, 232; 279/62, 61, 60, 157, 902

(56) References Cited

U.S. PATENT DOCUMENTS

| | | | | |
|---|---|---|---|---|
| 4,621,819 A | * | 11/1986 | Rohm | .......................... 279/140 |
| 5,580,197 A | * | 12/1996 | Rohm | .......................... 408/240 |
| 5,590,985 A | * | 1/1997 | Mack | ........................... 408/56 |
| 5,716,057 A | * | 2/1998 | Wright et al. | .................. 279/62 |
| 5,927,914 A | * | 7/1999 | Mack et al. | ................. 408/240 |
| 6,070,884 A | * | 6/2000 | Mack | ........................... 279/62 |
| 6,173,972 B1 | * | 1/2001 | Temple-Wilson et al. | ..... 279/62 |
| 6,179,301 B1 | * | 1/2001 | Steadings et al. | ............. 279/62 |
| 6,241,259 B1 | * | 6/2001 | Gaddis et al. | ................ 279/63 |

* cited by examiner

Primary Examiner—Henry W. H. Tsai
(74) Attorney, Agent, or Firm—Nelson Mullins Riley & Scarborough, LLP

(57) ABSTRACT

A chuck includes a generally cylindrical body having a nose section and a tail section. The tail section is configured to rotate with the drive shaft, and the nose section has an axial bore formed therein. The body defines an air passageway extending through the body between the axial bore and an area about the tail section. A generally cylindrically sleeve is disposed about the body and substantially encloses the area. It is configured to extend to a housing of the drill so that air from the fan is forced into the area, through the air passageway and into the axial bore.

33 Claims, 9 Drawing Sheets

SELF-CLEANING DRILL CHUCK

This is a continuation of U.S. application Ser. No. 09/733,856 filed Dec. 8, 2000 Now Abandoned, the entire disclosure of which is incorporated by reference herein.

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck that is adjustable over a relatively wide range. The chuck may be attached to the driver by a threaded or tapered bore.

A variety of chucks have been developed in the art. In an oblique jawed chuck, for example, a chuck body includes three passageways disposed approximately 120° apart from each other. The passageways are configured so that their center lines meet at a point along the chuck axis forward of the chuck. The passageways constrain three jaws that are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached onto the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Examples of such chucks are disclosed in U.S. Pat. Nos. 5,125,673 and 5,193,824, commonly assigned to the present assignee and the entire disclosures of which are incorporated by reference herein. Various configurations of keyless chucks are known in the art and are desirable for a variety of applications.

When using a chuck to drill masonry, dust from the drilled hole may move into the chuck's central bore. Dust moving into the jaw passageways may adhere to the greased jaw threads and nut threads, thereby tending to inhibit the chuck's operation.

SUMMARY OF THE INVENTION

The present invention recognizes and addresses the foregoing considerations, and others, of prior art constructions and methods.

Accordingly, it is an object of the present invention to provide an improved chuck.

It is a further object of the present invention to provide an improved power driver.

These and other objects are achieved by a chuck for use with a powered driver having a rotatable drive shaft and a cooling fan. The chuck includes a generally cylindrical body having a nose section and a tail section. The tail section is configured to rotate with the drive shaft. The nose section has an axial bore formed therein. The body defines an air passageway extending through the body between axial bore and an area about the tail section. A generally cylindrical first sleeve is disposed about the body. The first sleeve substantially encloses the area and is configured to extend to a housing of the drill so that air from the fan is forced into the area, through the air passageway and into the axial bore.

In another embodiment, the present invention includes a powered driver having a housing, a rotatable drive shaft, a cooling fan and a motor in rotationally driving engagement with the drive shaft and the cooling fan. The driver also includes a chuck having a generally cylindrical body with a nose section and a tail section. The tail section is configured to rotate with the drive shaft, and the nose section has an axial bore formed therein and a plurality of jaw passageways formed therethrough and intersecting the axial bore. The body defines an air passageway extending through the body between the axial bore and an area about the tail section. A plurality of jaws are movably disposed in the jaw passageways. A generally cylindrical first sleeve is disposed about the body. The first sleeve substantially encloses the area and is configured to extend to the housing so that air from the fan is forced into the area, through the air passageway and into the axial bore.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
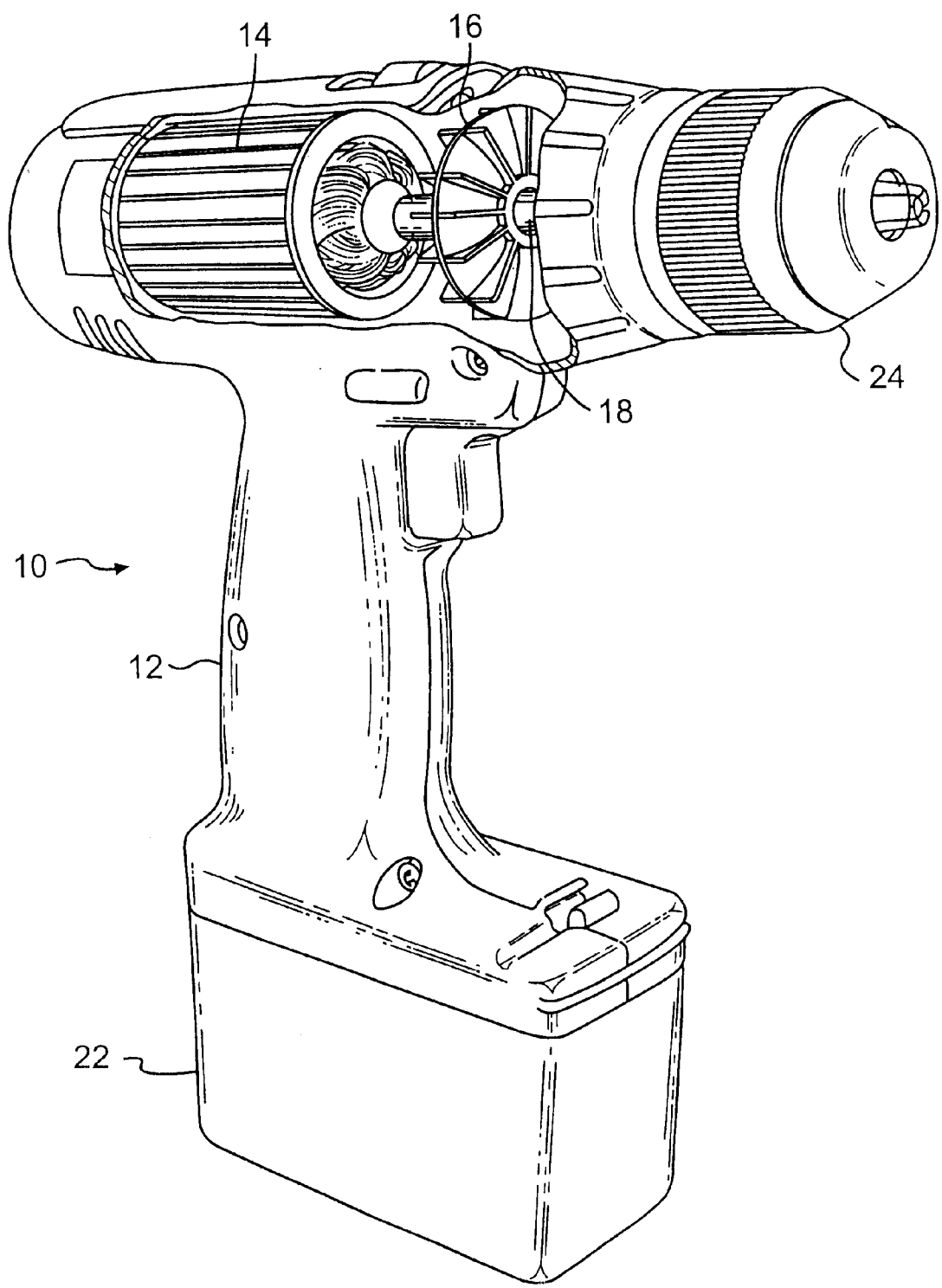
FIG. 1 is a perspective view, partly in section, of a powered driver in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

Referring to FIG. 1, a powered driver, in this case a hand-held drill, 10 includes a housing 12 in which is disposed a motor 14 that drives a cooling fan 16 and that drives a spindle 18 through suitable gearing (not shown). As should be well understood, motor 14 may be powered by an in-line source through a plug or by a battery 22.

Figure 2:
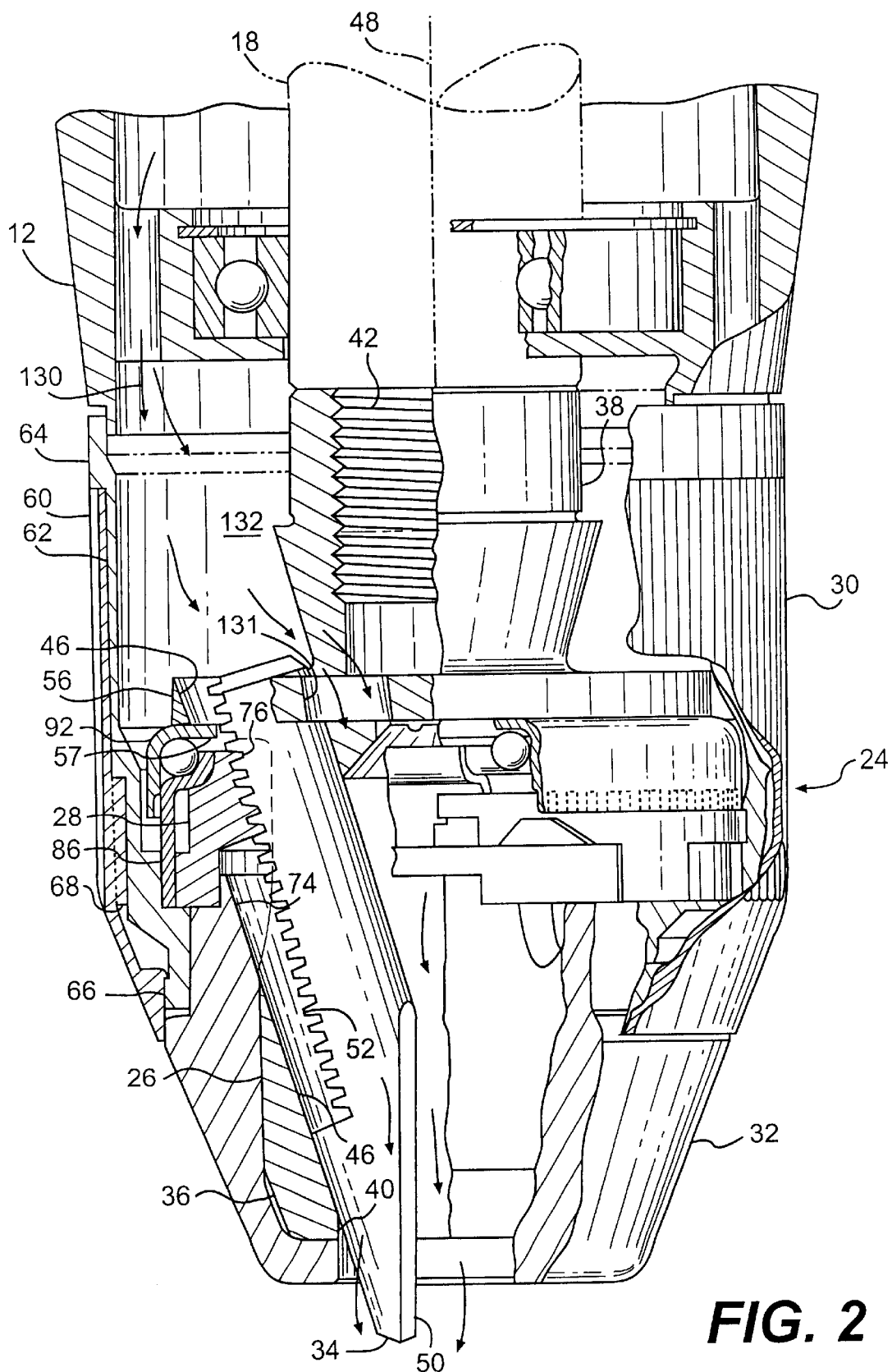
FIG. 2 is a partial plan view, partly in section, of the driver as in FIG. 1.
Figure 3:
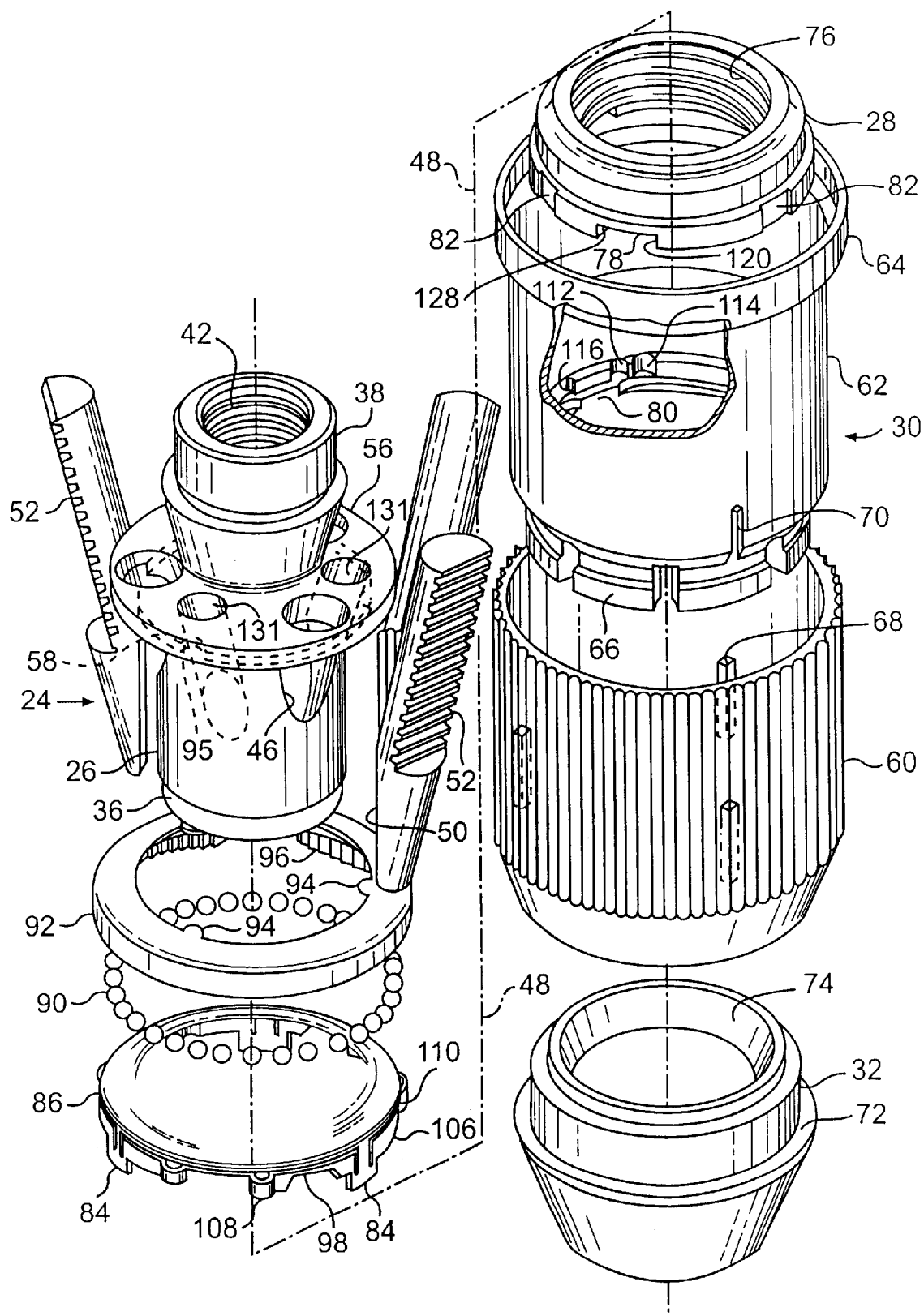
FIG. 3 is an exploded view of the chuck as shown in FIG. 2.

Referring also to FIGS. 2 and 3, drill 10 includes a chuck 24 having a body 26, a nut 28, a sleeve 30, a nose piece 32 and a plurality of jaws 34. Body 26 is generally cylindrical in shape and comprises a nose of forward section 36 and a tail or rearward section 38. Nose section 36 defines an axial bore 40 that is dimensioned somewhat larger than the largest tool shank that the chuck is designed to accommodate. A threaded bore 42 is formed in tail section 38 and is of a standard size to mate with drive shaft 18. The bores 40 and 42 may communicate at a central region of body 26. While a threaded bore 42 is illustrated, such bore could be replaced with a tapered bore of a standard size to mate with a tapered drive shaft. Furthermore, body 26 may be formed integrally with drive shaft 18.

Figure 6:
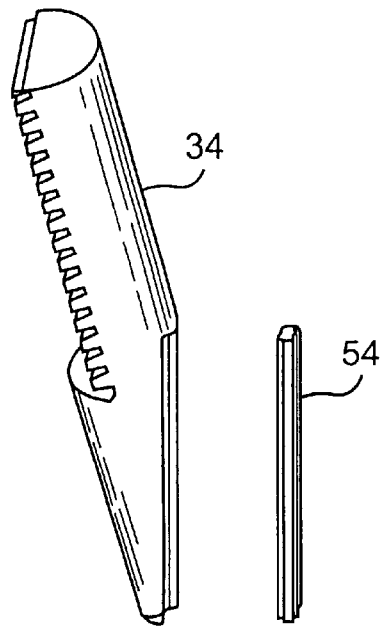
FIG. 6 is a partial perspective view of a chuck jaw of the chuck as shown in FIG. 2.

Body 26 defines three passageways 46 to respectively accommodate three jaws 34. Each jaw is separate from the adjacent jaw by an arc of approximately 120°. The axes of passageways 46 and jaws 34 are angled with respect to the chuck center axis 48 such that each passageway axis travels through axial bore 40 and intersects axis 48 at a common point ahead of the chuck body. The jaws form a grip that moves radially toward and away from the chuck axis to grip a tool, and each jaw 34 has a tool engaging face 50 generally parallel to axis 48. Threads 52, formed on each jaw's opposite or outer surface, may be constructed in any suitable type and pitch. As shown in FIG. 6, each jaw 34 may be formed with carbide inserts 54 pressed into its tool-engaging surface.

As illustrated in FIGS. 2 and 3, body 26 includes a radially extending forward flange 56 that, in a preferred embodiment, may be integral with the body. It should be understood, however, that flange 56 and body 26 may be separate components. Jaw passageways 46 extend through flange 56 to permit retraction of jaws 34 therethrough, and the flange includes a ledge portion 58 to receive a bearing assembly as described below.

Nose piece 32 retains nut 28 against forward axial movement and is press fit to nose section 36. It should be understood, however, that other methods of axially securing the nut on the body may be used. For example, the nut may be a two-piece nut held on the body within a circumferential groove on the body's outer circumference. Nose piece 32 may be coated with a nonferrous metallic coating to prevent rust and enhance its appearance. Examples of suitable coatings include zinc or nickel, although it should be appreciated that any suitable coating could be utilized.

Sleeve 30 may include a metallic outer portion 60 and a polymer inner portion 62. Outer portion 60 is axially secured to inner portion 62 between shoulders 64 and 66 of inner portion 62 and is rotationally secured to inner portion 62 by three dogs 68 received in respective slots 70 in inner portion 62. Outer portion 60 may be made from aluminum, steel or any other suitable metal. Its outer surface may be knurled or may be provided with longitudinal ribs or other protrusions to enable the operator to grip it securely. Inner portion 62 may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials from which the chuck of the present invention is fabricated will depend on the end use of the chuck, and the above materials are provided by way of example only.

Sleeve 30 is secured from movement in the forward axial direction by an annular shoulder 72 on the nose piece 32. A frustoconical section 74 at the rearward end of the nose piece facilitates movement of jaws 34 within the chuck.

Nut 28 has threads 76 for mating with jaw threads 52. Nut 28 is positioned about the body in engagement with the jaw threads so that when the nut is rotated with respect to body 26, the jaws will be advanced or retracted depending on the nut's rotational direction.

Figure 4:
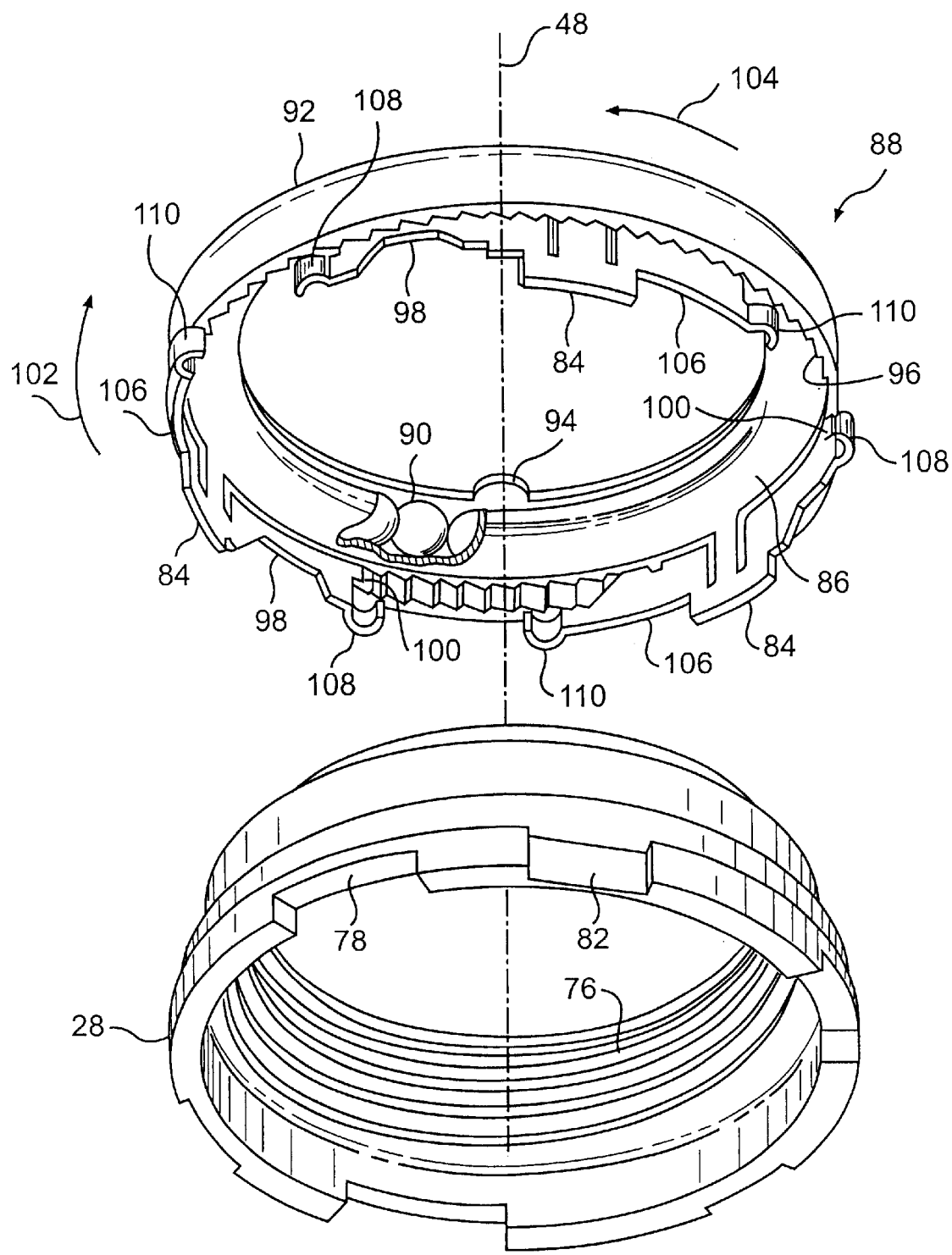
FIG. 4 is an exploded view of a bearing and nut of the chuck as shown in FIG. 2.

As also shown in FIG. 4, the nut's forward axial face includes recesses 78 that receive respective drive dogs 80 (FIG. 3) extending from the inner surface of inner sleeve portion 62. The angular width of the drive dogs is less than that of the recesses, resulting in a slight range of relative rotational movement, for example between 6° and 10°, between the nut and the sleeve. Nut 28 also defines a plurality of grooves formed as flats 82 about the nut's outer circumference. Flats 82 receive respective tabs 84 extending forward from an inner race 86 of a bearing assembly 88. The engagement of tabs 84 and flats 82 rotationally fix the inner race to the nut, although it should be understood that there may be a slight rotational tolerance between the two.

Inner race 86 receives a plurality of bearing elements, in this case bearing balls, 90 disposed between it and an outer race 92 seated on flange ledge 58 (FIG. 3). Outer race 92 is rotationally fixed to body 26 by plurality of tabs 94 received in corresponding groves 95 in the flange ledge.

Outer race 92 also includes a ratchet. In the illustrated embodiment, the ratchet is formed by plurality of sawtooth-shaped teeth 96 disposed about the inner circumferential surface of the outer race. A first pawl 98 extends from one side of each tab 84 and is biased radially outward from the inner race, thereby urging a distal end 100 of each pawl 98 toward the outer race ratchet.

Each tooth 96 has a first side with a slope approaching 90°. The second side has a lesser slope. Pawl 98 is deflectable and is generally disposed in alignment with the slope of the second side. Thus, rotation of inner race 86 in a direction 102 with respect to outer race 92 moves pawl distal ends 100 repeatedly over teeth 96, causing a clicking sounds as ends 100 fall against each subsequent tooth's second side. This configuration of teeth 96 and pawl 98, however, prevents the inner race's rotation in an opposite direction 104. Application of rotational force to the inner race in this direction forces distal ends 100 into the steep-sloped first sides of teeth 96. Since pawl 98 is generally perpendicular to the first sides, it does not deflect inward to permit rotation.

As discussed below, direction 102 corresponds to the chuck's closing direction, while direction 104 corresponds to the chuck's opening direction. Accordingly, when pawls 98 engage ratchet teeth 96, the teeth permit the inner race's movement in the chuck's opening direction but prevent its movement in the closing direction.

A second deflectable pawl 106 extends to the other side of each tab 84. Like pawls 98, each pawl 106 is biased radially outward. Unlike pawls 86, however, pawls 106 do not engage the outer race ratchet.

Figure 5A:
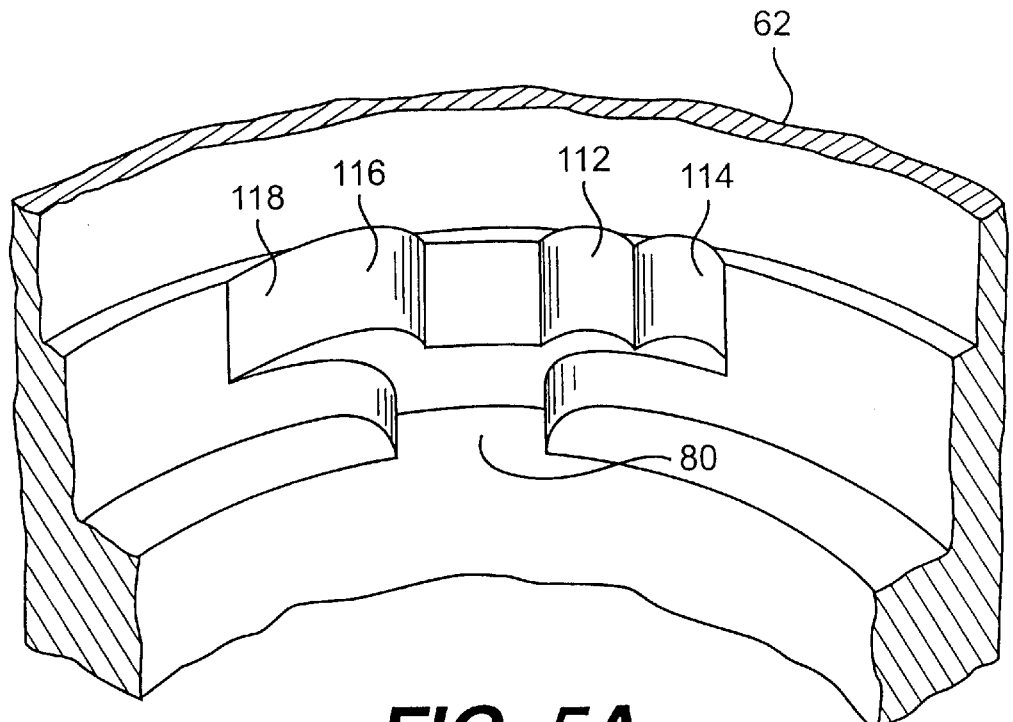
FIG. 5A is a partial perspective view of a sleeve of the chuck as shown in FIG. 2.

Pawls 98 and 106 include tabs 108 and 110 at their distal ends. Referring also to FIG. 5A, an inner circumferential surface of inner sleeve portion 62 defines first and second recesses 112 and 114. During the chuck's operation, each tab 100 is received in one of these recesses, depending on the sleeve's rotational position with respect to the nut as discussed in more detail below. The sleeve also defines a third recess 116 and a cam surface 118. Also depending on the sleeve's rotational position, each tab 108 is received either by a cam surface or by a recess 116. The sleeve includes a pair of recesses 112, 114 for each tab 110 and a recess 116 and cam surface 118 for each tab 108.

Figure 5B:
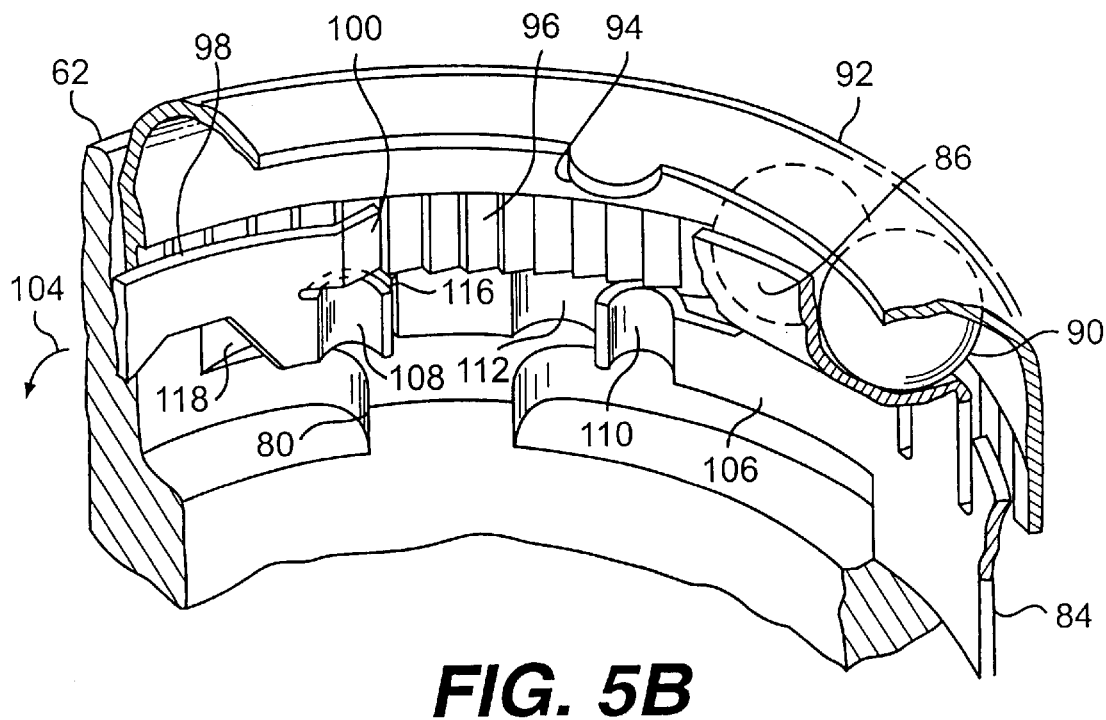
FIG. 5B is a partial perspective view of the bearing and sleeve of the chuck as shown in FIG. 2.
Figure 5C:
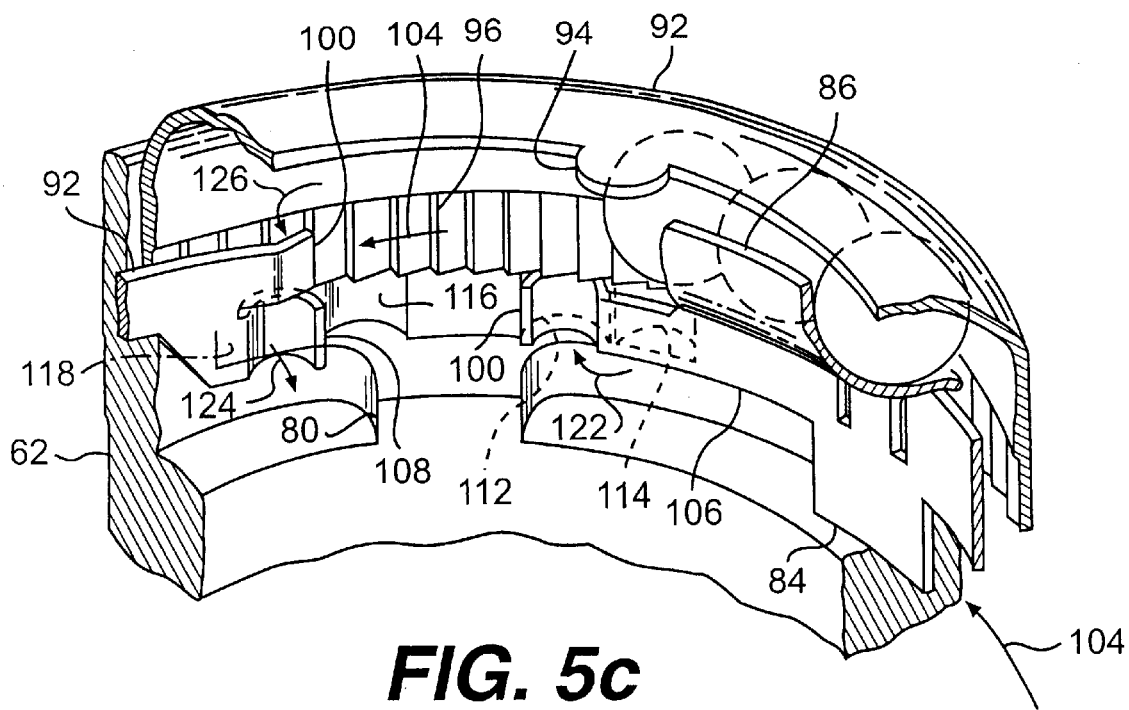
FIG. 5C is a partial perspective view of the bearing and sleeve as shown in FIG. 2.

FIG. 5C illustrates the disposition of pawls 98 and 106 when sleeve 30 is in a first of two positions with respect to the nut, while FIG. 5B illustrates these components when the sleeve is in a second position with respect to the nut. For ease of illustration, both figures omit the nut. However, referring to FIG. 3 and to the sleeve's second position as shown in FIG. 5B, each drive dog 80 is disposed against or adjacent to a side 120 of the gap 78 in which it is received. Each of the sleeve's recesses 114 receives tab 110 of one of the pawls 106, and each recess 116 receives tab 108 of one of the pawls 98. Accordingly, the distal end 100 of each pawl 98 engages ratchet teeth 96, and inner race 86 can rotate only in direction 104 with respect to outer race 92.

Referring now to FIG. 5C, when inner race 86 moves in opening direction 104 with respect to the sleeve, each tab 100 moves out of its recess 114 and into its recess 112, as indicated by arrow 122. Each tab 108 rides up and out of its recess 116 onto its cam surface 118, as indicated by arrow 124. As indicated by arrow 126, this pushes each deflectable tab 92 radially inward, thereby disengaging distal ends 100 from ratchet teeth 96. Thus, the inner race is free to rotate in either direction with respect to the outer race.

As described in more detail below, when sleeve 30 rotates in direction 104 so that the inner race moves from the position shown in FIG. 5B to the position shown in FIG. 5C, drive dogs 80 move within grooves 78 of nut 28 (FIG. 3) so that each drive dog is against or immediately adjacent to a side 128 of the groove. In operation, and referring to FIGS. 3, 4, 5B and 5C, nut grooves 78 receive drive dogs 80 when the chuck is between fully opened and fully closed positions so that the drive dogs are adjacent groove sides 120. Inner race 86 is disposed with respect to outer race 92 so that tabs 108 and 110 are received by cam surface 118 and recess 112, respectively. That is, sleeve 30 is in the first position with respect to the nut. In this condition, tabs 100 and recesses 112 rotationally fix inner race 86 to sleeve 30. Since inner race 86 is rotationally fixed to nut 28 by tabs 84 and flats 82, an operator rotating sleeve 30 rotationally drives the nut through inner race 86, thereby opening or closing the jaws. When the operator rotates the sleeve, the bearing inner race and the nut in the closing direction (indicated by arrow 102 in FIG. 4) to the point that the jaws tighten onto a tool shank, the nut is urged rearward up the jaw threads, thereby pushing the nut against inner race 86, bearing elements 90 and flange 56. The rearward force creates a frictional lock between the nut and inner race 86 that further rotationally fixes the two components.

The wedge between the nut threads and jaw threads increasingly resists the nut's rotation. When the operator continues to rotate sleeve 30, and the resistance overcomes the hold provided by tabs 110 in recesses 112, sleeve 30 rotates with respect to nut 28 and inner bearing race 86. This moves drive dogs 80 from sides 120 of grooves 78 to sides 128 and pushes tabs 110 out of recesses 112 into recesses 114. Simultaneously, cam surfaces 118 rotate away from tabs 108 so that the tabs are released into recesses 116, thereby engaging distal ends 100 of pawls 98 with ratchet teeth 96, as shown in FIG. 5B. At this point, inner race 86, and therefore nut 28, is rotationally locked to outer race 92, and therefore body 26, against rotation in the chuck's opening direction. That is, the nut is rotationally locked to the chuck body in the opening direction. Since the nut's rotation with respect to the body is necessary to open the chuck, this prevents inadvertent opening during use.

Inner race 86, and therefore nut 28, may, however, still rotate with respect to outer race 92 and body 26 in the chuck's closing direction. During such rotation, sleeve 30 drives nut 28 through drive dogs 80 against groove sides 128, as well as through inner race 86. This continues to tighten the chuck and, as described above, produces a clicking sound to notify the operator that the chuck is in a fully tightened position. To open the chuck, the operator rotates sleeve 30 in the opposite direction. Sleeve 30 transfers this torque to inner race 86 at the engagement of tabs 108 and 110 in recesses 116 and 114, respectively. Because pawls 98 engage outer race 92, which is rotationally fixed the body, through the ratchet teeth, the inner race cannot rotate with the sleeve. Thus, upon application of sufficient torque in the opening direction, sleeve 30 moves with respect to the inner race and the nut. This moves tabs 108 back up onto cam surfaces 118, thereby disengaging pawls 98 from ratchet teeth 96. Tabs 110 move from recesses 114 into recesses 112, and drive dogs 80 move from sides 128 to sides 120 of grooves 78. Thus, the sleeve moves to its first position with respect to the nut, as shown in FIG. 5C, and the inner race and nut are free to rotate with respect to the outer race and chuck body. Accordingly, further rotation of sleeve 30 in the opening direction moves jaws 34 away from the chuck axis, thereby opening the chuck.

It should be understood that the locking mechanism may be achieved in a variety of suitable forms and that, furthermore, the present invention may be used in a chuck not having a locking mechanism. Moreover, it should be understood that a variety of chuck formations may be employed within the present invention. For example, a chuck may include a body, a nut that is rotationally fixed but axially moveable with respect to the body, and an outer sleeve that threadedly engages the nut so that rotation of the sleeve moves the nut axially on the body. The jaws may be axially fixed to the nut and received in body passageways so that the nut's axial movement drives the jaws toward and away from the chuck axis.

Referring again to FIGS. 2 and 3, sleeve 30 extends rearwardly to drill housing 12. Drill housing 12 forms an opening at chuck 24 so that air 130 forced out of the opening by fan 16 (FIG. 1) is pushed into an area between the body tail section and the inner surface of inner sleeve portion 62.

Body 26 defines three air passageways 131 extending between nose section axial bore 40 and rear area 132. The passageways are disposed at an angle of approximately 15° with respect to chuck axis 48. As body 26 rotates with the drill spindle, air in the air passageways, and from axial bore 40, is urged radially outward toward rear area 132. The pressure created by the drill's cooling fan, however, overcomes this centrifugal bias. Thus, the fan pushes air from area 132 through air passageways 131 into axial bore 40 and out through the front of the chuck. The resulting air flow tends to clear the axial bore of dust that might otherwise move into the bore from the drilling hole and prevents contamination of the interface between the nut and the jaw threads.

Figure 7:
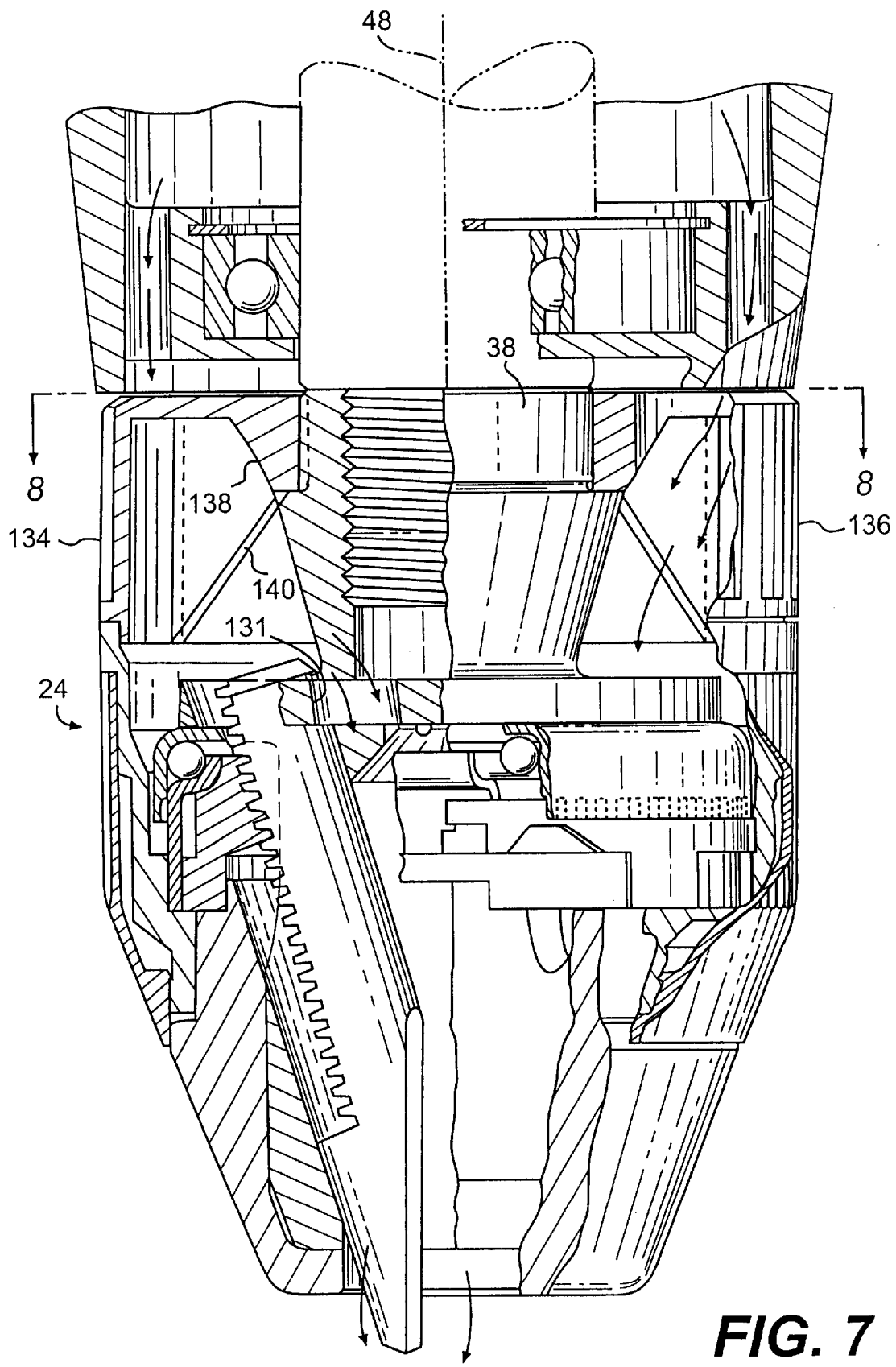
FIG. 7 is a plan view, partly in section of a chuck in accordance with an embodiment of the present invention.

Referring to FIG. 7, another embodiment of chuck 24 includes a rear sleeve 134 pressed to body tail section 38. Tail section 38 may be knurled to facilitate the press fit. The rear sleeve could also be retained by press fit without knurling, by use of a key or by crimping, staking, riveting, threading or any other suitable securing mechanism. The rear sleeve's outer surface may be knurled or ribbed if desired.

Figure 8:
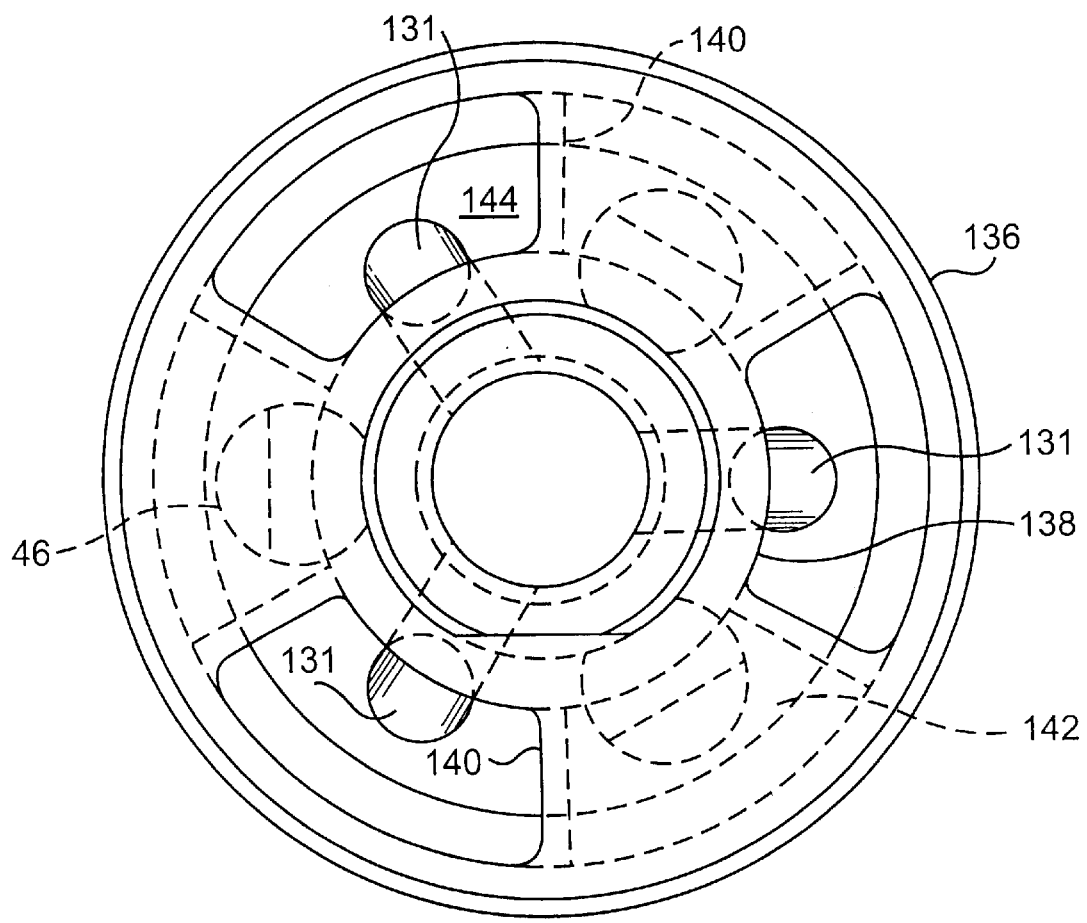
FIG. 8 is a rear view of the chuck as in FIG. 7.

Referring also to FIG. 8, the rear sleeve includes an outer annular portion 136 that is gripped by an operator and an inner annular portion 138 pressed to the body. Six dividers 140, here formed as fins, extend between annular portions 136 and 138 and divide rear area 132 into three chambers 142, into which the jaw passageways open, and three chambers 144, into which air passageways 131 open. The rear sleeve's rear face is closed over chambers 142, blocking air flow 130 into those chambers. Fins 140 tend to inhibit air flow 130 from reaching chambers 142 from chambers 144, thereby protecting the nut and jaw threads from dust that may be present in air flow 130 that might otherwise reach the threads through the jaw passageways.

Figure 9:
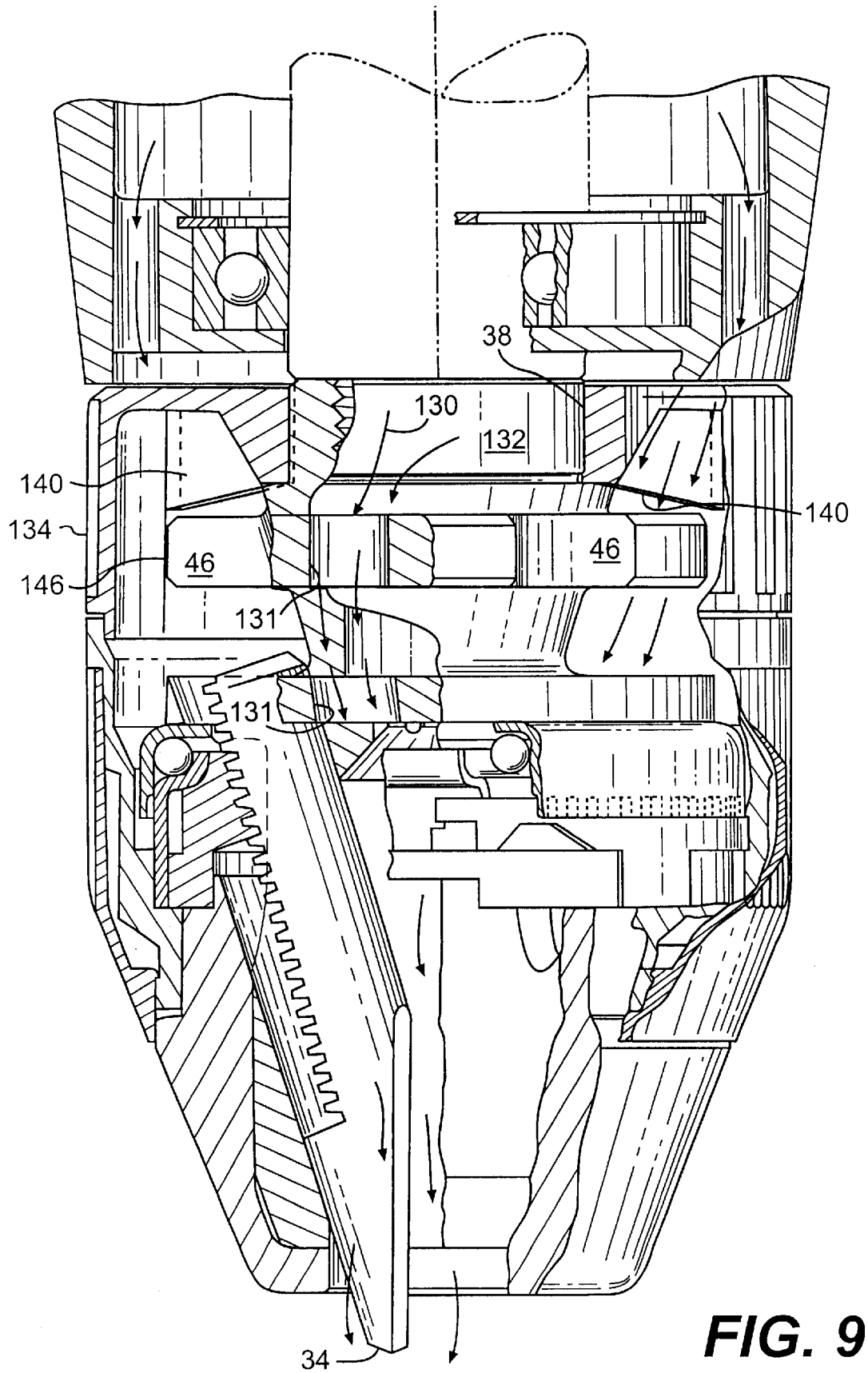
FIG. 9 is a side plan view, partly in section, of a chuck in accordance with an embodiment of the present invention.

Referring now to FIG. 9, the chuck may also include a rear flange 146 extending radially outward from body tail section 38. As with the front flange, rear flange 146 may be unitarily formed with, or separate from, the body. Jaw passageways 46 extend through the rear flange to permit retraction of jaws 34 therethrough. Air passageways 131 also extend through the rear flange. Fins 140 extend through rear area 132 behind the rear flange.

Drill 10 (FIG. 1) may be a hammer-type drill so that chuck 24, and therefore sleeve 30 and rear sleeve 134, if present, move reciprocally with respect to the drill housing. Accordingly, while a seal may be provided between the sleeve and the drill housing, a seal is not necessarily present, and movement between the sleeve and the drill housing may create a varying gap between the two. The resulting air leak is, however, relatively small and does not appreciably affect air flow 130. Similarly, while the sleeve in the embodiment illustrated in FIG. 2 should extend to the drill housing, it does not necessarily engage the drill housing.

While one or more preferred embodiments of the present invention have been described above, it should be understood that any and all equivalent realizations of the present invention are included within the scope and spirit thereof. Thus, the depicted embodiment(s) are presented by way of example only and are not intended as limitations on the present invention. It should be understood that aspects of the various one or more embodiments may be interchanged both in whole or in part. Therefore, it is contemplated that any and all such embodiments are included in the present invention as may fall within the literal or equivalent scope of the appended claims.

What is claimed is:

1. A chuck for use with a powered driver having a rotatable drive shaft and a cooling fan, said chuck comprising:
    a generally cylindrical body having a nose section and a tail section, said tail section being configured to rotate with the drive shaft and said nose section having an axial bore formed therein and a plurality of jaw passageways formed therethrough and intersecting said axial bore, wherein said body defines an air passageway that is angularly offset from said jaw passageways, with respect to a plane perpendicular to the axis of said body, and that extends through said body between said axial bore and an area about said tail section;
    a plurality of jaws movably disposed in said jaw passageways; and
    a generally cylindrical first sleeve disposed about said body, wherein said first sleeve substantially encloses said area and is configured to extend to a housing of the powered driver so that air from the fan is forced into said area, through said air passageway and into said axial bore.

2. The chuck as in claim 1, including a nut rotatably mounted about said body in operative communication with said jaws so that rotation of said nut in a closing direction moves said jaws toward the axis of said axial bore and rotation of said nut in an opening direction moves said jaws away from said axis.

3. The chuck as in claim 2, including a flange extending radially outward from said body in engagement with said nut so that said nut transfers rearward axial force to said body through said flange.

4. The chuck as in claim 3, wherein said flange is formed unitarily with said body.

5. The chuck as in claim 3, including a bearing disposed between said flange and said nut.

6. The chuck as in claim 1, including a plurality of said air passageways.

7. The chuck as in claim 1, wherein said first sleeve extends from said nose section rearwardly to the drill housing.

8. The chuck as in claim 7, including a nosepiece fixed to said nose section forward of said first sleeve.

9. The chuck as in claim 1, wherein said first sleeve is rotationally fixed to said tail section and wherein said chuck includes a second generally cylindrical sleeve rotatably disposed about said body forward of said first sleeve.

10. The chuck as in claim 1, including a plurality of dividers in said area extending between said tail section and an inner surface of said first sleeve so that said dividers form a chamber within said area, wherein said chamber receives said air, wherein said air passageway extends between said chamber and said axial bore and each said jaw passageway extends from said area outside said chamber to said axial bore.

11. The chuck as in claim 10, wherein at least one of said body and said first sleeve form said dividers.

12. The chuck as in claim 11, wherein said first sleeve forms said dividers.

13. The chuck as in claim 12, wherein said first sleeve is rotationally fixed to said tail section and wherein said chuck includes a second generally cylindrical sleeve rotatably disposed about said body forward of said first sleeve.

14. The chuck as in claim 10, wherein said body includes a first flange extending radially outward therefrom and through which said jaw passageways extend, and wherein said chamber extends forward to said first flange.

15. The chuck as in claim 14, including a nut rotatably mounted about said body in operative communication with said jaws so that rotation of said nut in a closing direction moves said jaws toward the axis of said axial bore and rotation of said nut in an opening direction moves said jaws away from said axis, wherein said nut engages said first flange so that said nut transfers rearward axial force to said body through said flange.

16. The chuck as in claim 10, wherein
    said body includes a first flange extending radially outward therefrom and through which said jaw passageways extend, said chuck includes a nut rotatably mounted about said body in operative communication with said jaws so that rotation of said nut in a closing direction moves said jaws toward the axis of said axial bore and rotation of said nut in an opening direction moves said jaws away from said axis, wherein said nut engages said first flange so that said nut transfers rearward axial force to said body through said flange, said body includes a second flange rearward of said first flange and extending radially outward from said body, and said chamber extends forward to said second flange.

17. The chuck as in claim 16, wherein said passageways extend through said second flange.

18. A chuck for use with a powered driver having a rotatable drive shaft and a cooling fan, said chuck comprising:
a generally cylindrical body having a nose section and a tail section, said tail section being configured to rotate with the drive shaft and said nose section having an axial bore formed therein and a plurality of jaw passageways formed therethrough and intersecting said axial bore, wherein said body includes a first flange extending radially outward therefrom and through which said jaw passageways extend, and wherein said body defines a plurality of air passageways angularly offset from said jaw passageways, with respect to a plane perpendicular to the axis of said body, and extending through said body between said axial bore and an area about said tail section rearward of said first flange;
a plurality of jaws movably disposed in said jaw passageways;
a nut rotatably mounted about said body in operative communication with said jaws so that rotation of said nut in a closing direction moves said jaws toward the axis of said axial bore and rotation of said nut in an opening direction moves said jaws away from said axis; and
a generally cylindrical first sleeve disposed about said body, wherein said first sleeve substantially encloses said area and is configured to extend to a housing of the powered driver so that air from the fan is forced into said area, through said air passageways and into said axial bore.

19. The chuck as in claim 18, wherein said nut engages said first flange so that said nut transfers rearward axial force to said body through said first flange.

20. The chuck as in claim 18, wherein said body includes a second flange forward of said first flange and extending radially outward from said body, and wherein said nut engages said second flange so that said nut transfers rearward axial force to said body through said second flange.

21. The chuck as in claim 18, including three said air passageways.

22. The chuck as in claim 19, wherein at least one of said first sleeve and said body define dividers forming separate chambers within said area, wherein each said air passageway and said jaw passageway opens into a respective said chamber, and wherein said chambers into which said air passageways open communicate with the drill housing so that said air is forced therein.

23. The chuck as in claim 20, wherein at least one of said first sleeve and said body define dividers forming separate chambers within said area, wherein each said air passageway and said jaw passageway opens into a respective said chamber, and wherein said chambers into which said air passageways open communicate with the drill housing so that said air is forced therein.

24. The chuck as in claim 22, wherein said first sleeve is rotationally fixed to said tail section and forms said dividers, and wherein said chuck includes a second generally cylindrical sleeve rotatably disposed about said body forward of said first sleeve in rotationally driving engagement with said nut.

25. The chuck as in claim 23, wherein said first sleeve is rotationally fixed to said tail section and forms said dividers, and wherein said chuck includes a second generally cylindrical sleeve rotatably disposed about said body forward of said first sleeve in rotationally driving engagement with said nut.

26. A powered driver, said driver comprising:
a housing;
a rotatable drive shaft;
a cooling fan;
a motor in rotationally driving engagement with said drive shaft and said cooling fan; and
a chuck, said chuck including
a generally cylindrical body having a nose section and a tail section, said tail section being configured to rotate with said drive shaft and said nose section having an axial bore formed therein and a plurality of jaw passageways formed therethrough and intersecting said axial bore, wherein said body defines an air passageway that is angularly offset from said jaw passageways, with respect to a plane perpendicular to the axis of said body, and that extends through said body between said axial bore and an area about said tail section,
a plurality of jaws movably disposed in said jaw passageways; and
a generally cylindrical first sleeve disposed about said body, wherein said first sleeve substantially encloses said area and is configured to extend to said housing so that air from said fan is forced into said area, through said air passageway and into said axial bore.

27. The driver as in claim 26, including a nut rotatably mounted about said body in operative communication with said jaws so that rotation of said nut in a closing direction moves said jaws toward the axis of said axial bore and rotation of said nut in an opening direction moves said jaws away from said axis.

28. The driver as in claim 26, including a plurality of said air passageways.

29. The driver as in claim 26, including a plurality of dividers in said area extending between said tail section and an inner surface of said first sleeve so that said dividers form a chamber within said area, wherein said chamber receives said air, wherein said air passageway extends between said chamber and said axial bore and each said jaw passageway extends from said area outside said chamber to said axial bore.

30. The driver as in claim 29, wherein said first sleeve forms said dividers, wherein said first sleeve is rotationally fixed to said tail section and wherein said chuck includes a second generally cylindrical sleeve rotatably disposed about said body forward of said first sleeve.

31. The driver as in claim 29, wherein said body includes a first flange extending radially outward therefrom and through which said jaw passageways extend, and wherein said chamber extends forward to said first flange.

32. The driver as in claim 31, including a nut rotatably mounted about said body in operative communication with said jaws so that rotation of said nut in a closing direction moves said jaws toward the axis of said axial bore and rotation of said nut in an opening direction moves said jaws away from said axis, wherein said nut engages said first flange so that said nut transfers rearward axial force to said body through said flange.

33. The driver as in claim 29, wherein said body includes a first flange extending radially outward therefrom and through which said jaw passageways extend, said chuck includes a nut rotatably mounted about said body in operative communication with said jaws so that rotation of said nut in a closing direction moves said jaws toward the axis of said axial bore and rotation of said nut in an opening direction moves said jaws away from said axis, wherein said nut engages said first flange so that said nut transfers rearward axial force to said body through said flange, said body includes a second flange rearward of said first flange and extending radially outward from said body, and said chamber extends forward to said second flange.

* * * * *